United States Patent

Matsutoh et al.

[11] Patent Number: 4,603,754
[45] Date of Patent: Aug. 5, 1986

[54] DRIVE SYSTEM FOR ENGINE-DRIVEN LIGHT VEHICLES

[75] Inventors: Takushi Matsutoh, Tokyo; Goroei Wakatsuki, Fujimi; Yoshitaka Kitamura, Sakado; Takeo Ishihara, Asaka, all of Japan

[73] Assignee: Honda Giken Kogyo Kabushiki Kaisha, Tokyo, Japan

[21] Appl. No.: 638,759

[22] Filed: Aug. 8, 1984

[30] Foreign Application Priority Data

Aug. 10, 1983 [JP] Japan ................................ 58-145838
Aug. 22, 1983 [JP] Japan ................................ 58-152737

[51] Int. Cl.[4] .............................................. B62M 7/06
[52] U.S. Cl. ...................................................... 180/221
[58] Field of Search ............... 180/221, 222, 205, 206, 180/207, 74; 74/6; 123/179 SE

[56] References Cited

U.S. PATENT DOCUMENTS 2,745,504  5/1956  Gilardi ............................ 180/221 X
4,172,504  10/1979  Muto ................................ 180/221

FOREIGN PATENT DOCUMENTS 98342  5/1961  Netherlands ........................ 180/221

Primary Examiner—John A. Pekar
Attorney, Agent, or Firm—Lyon & Lyon

[57] ABSTRACT

A drive system for an engine-driven light vehicle which transmits the engine rotation to a wheel of the vehicle through a friction roller during normal engine operation, and transmits the wheel rotation to the engine through the friction roller to start the engine. The friction roller has its drive shaft disposed parallel with the crankshaft of the engine, between which shafts is interposed a power transmission means, e.g. a gear train meshing with each other. At least one gear of the gear train is rotatably fitted on the crankshaft, with which engages a one-way clutch for transmitting the drive shaft rotation to the crankshaft with a ratio of speed change preset for the start of the engine. A planetary gear is coupled to the gear train for transmitting the crankshaft rotation to the drive shaft through the gear train with a large reduction ratio. Preferably, the planetary gear includes a centrifugal clutch provided on the crankshaft and adapted to allow transmission of the crankshaft rotation to the drive shaft when the crankshaft rotational speed exceeds a predetermined value.

8 Claims, 7 Drawing Figures

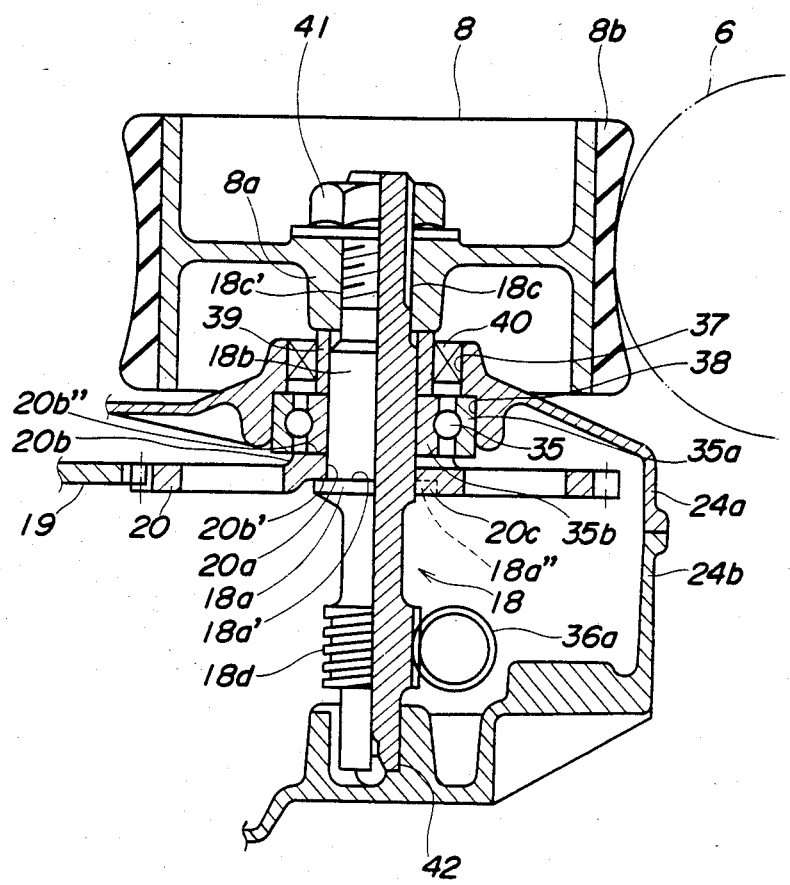

DRIVE SYSTEM FOR ENGINE-DRIVEN LIGHT VEHICLES

BACKGROUND OF THE INVENTION

This invention relates to a drive system for light vehicles equipped with engines, and more particularly to a drive system which is adapted to transmit the rotation of the engine to the driving wheel(s) through a friction roller during normal operation of the engine, and to transmit the rotation of the driving wheel(s) to the engine through the friction roller to start the engine.

In light vehicles such as bicycle-type motorcycles, i.e. bicycles with compact engines installed thereon, the drive system should desirably be compact in size, light in weight, and inexpensive. To this end, the individual component parts of the drive system should be designed as compact in size and simple in shape as possible, and should be designed so as to facilitate the assemblage and mounting into the vehicle.

However, a drive system of this kind is usually adapted to transmit the rotation of the crankshaft to the drive shaft of the friction roller with speed reduction so as to obtain a large driving force for rotatively driving the driving wheel during normal operation of the engine. According to this drive system, therefore, in starting the engine by rotating the driving wheel through kicking of the pedal, the transmission mechanism of the drive system acts as speed up gears to increase the rotational speed of the crankshaft to a higher speed than the drive shaft of the friction roller. This requires a large pedal-kicking force, making it difficult to achieve smooth starting of the engine.

To avoid such difficulty, there have been used a drive system which employs two separate transmission mechanisms drivingly coupling the crankshaft with the drive shaft, one of which operates during normal operation of the engine, and the other at the start of the engine, respectively, or a drive system in which during normal operation of the engine the crankshaft speed is transmitted from a small-sized pulley on the crankshaft to a large-sized pulley on the drive shaft with a certain reduction ratio, while at the start of the engine the drive wheel rotation is transmitted to the drive shaft through the friction roller by means of a planetary gear, and hence is transmitted to the crankshaft through the above two pulleys. However, while the former drive system is rather complicated in structure, the latter drive system has to be designed large in size due to the use of the large-sized pulley on the drive shaft.

SUMMARY OF THE INVENTION

It is an object of the invention to provide a drive system for use in light vehicles equipped with engines, which employs component parts easy to fabricate and assemble, and is compact in size, light in weight, and low in manufacturing cost.

It is a further object of the invention to provide a drive system of this kind, which can provide a large driving force for the driving wheel(s) and can also improve the startability of the engine.

A drive system according to the invention is adapted for use in a light vehicle including an engine having a crankshaft and a wheel. The drive system includes a friction roller disposed for frictional engagement with the wheel for transmitting the rotation of the engine to the wheel. The drive system is adapted to transmit the rotation of the wheel to the engine through the friction roller at the start of the engine. In the drive system, a drive shaft extends parallel with the crankshaft, on which the friction roller is supported to be rotatively driven thereby. A gear train is interposed between the drive shaft and the crankshaft, which has a plurality of gears meshing with each other, at least one of which is rotatably fitted on the crankshaft. A one-way clutch engages with the at least one gear and is adapted to transmit the rotation of the drive shaft to the crankshaft, whereby the rotation of the drive shaft is transmitted to the crankshaft through the gear train and the one-way clutch at the start of the engine. A planetary gear is coupled to the gear train and adapted to transmit the rotation of the crankshaft to the drive shaft through the gear train with a given reduction ratio.

Preferably, the planetary gear includes a centrifugal clutch disposed on the crankshaft for rotation therewith. The centrifugal clutch is adapted to transmit the rotation of the crankshaft to the drive shaft when the rotational speed of the crankshaft exceeds a predetermined value.

Also preferably, the planetary gear has a sun gear disposed on the crankshaft.

Preferably, the drive system according to the invention includes a generator rotor secured on the crankshaft. The friction roller is disposed on one side of the gear train, while the generator rotor is disposed on the other side of the gear train, in such a manner that the generator rotor and the friction roller overlap with each other in a direction perpendicular to the axes of the crankshaft and the drive shaft in a plane in which the crankshaft and the drive shaft are located.

Further preferably, a tubular member and a hollow threaded member are both fitted on the crankshaft. The crankshaft has a stepped shoulder formed therein, and a reduced diameter portion extending from the stepped shoulder and having a threaded end. The tubular member is fitted on the reduced diameter portion, and the hollow threaded member is screwed on the threaded end of the reduced diameter portion. The generator rotor is fitted on the reduced diameter portion in a manner such that at least the tubular member is interposed between the stepped shoulder of the crankshaft and the generator rotor. At least the tubular member and the generator rotor are fastened together to the crankshaft by the hollow threaded member.

Preferably, the drive system according to the invention includes an engine casing, a bearing provided on the engine casing and supporting the drive shaft, and a hollow threaded member fitted on one end of the drive shaft. The gear train has a final gear thereof fitted on the drive shaft. The above one end of the drive shaft extends through the engine casing to the outside and has a threaded portion formed thereon, on which the hollow threaded member is screwed. The drive shaft has a flange formed thereon at a predetermined location inside the engine casing. At least the final gear of the gear train, the bearing, and the friction roller are fitted on the drive shaft in the order mentioned from the above one end of the drive shaft and fastened together to the drive shaft by the hollow threaded member.

The above and other objects, features, and advantages of the invention will be more apparent from the ensuing detailed description taken in conjunction with the accompanying drawings.

BRIEF DESCRIPTION OF THE DRAWINGS

FIG. 7 is a fragmentary sectional view, on an enlarged scale, showing details of a friction roller and a drive shaft thereof appearing in FIG. 2.

DETAILED DESCRIPTION

The invention will now be described in detail with reference to the drawings showing a preferred embodiment thereof.

Figure 1:
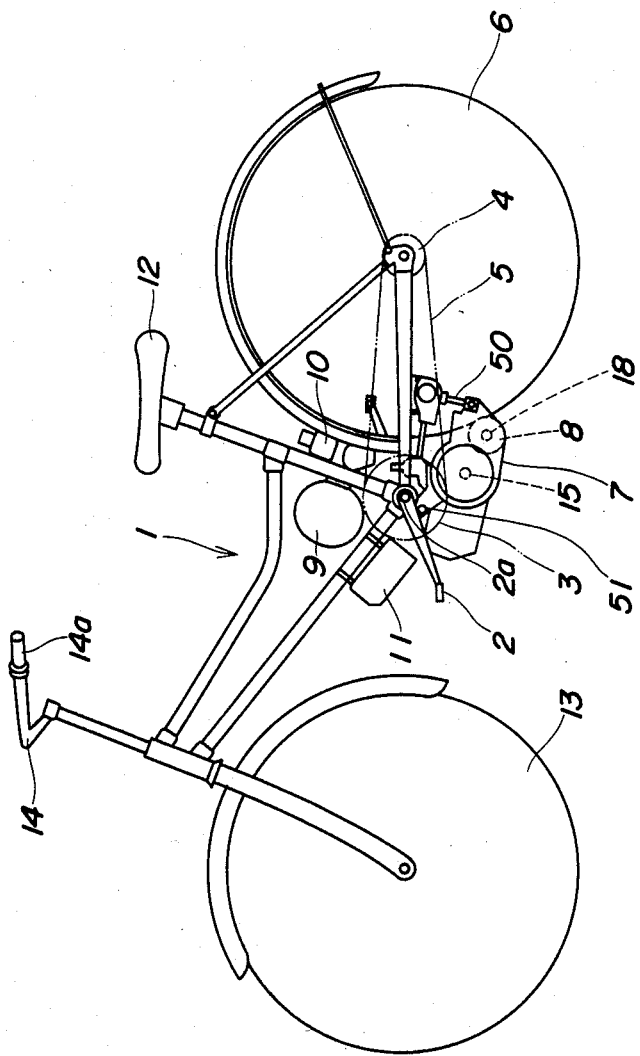
FIG. 1 is a side view of a bicycle equipped with an engine, on which is installed a drive system according to the present invention.

Referring first to FIG. 1, there is illustrated a bicycle 1 as a light vehicle, equipped with an engine 7, on which is installed a drive system according to the invention. The bicycle 1 includes a kick starting mechanism which is adapted to transmit the driver's kicking force from a pedal crank 2 to a rear wheel 6 by means of sprockets 3 and 4 and a chain 5 engaging therewith to rotatively drive the rear wheel 6, and a power driving mechanism which is adapted to transmit the rotation of the engine 7 to the rear wheel 6 by means of a friction roller 8, etc. to rotatively drive the rear wheel 6. Mounted on the frame body of the bicycle 1 are a fuel tank 9, an oil tank 10, and electric auxiliary equipment such as a battery box 11 mounted thereon. In FIG. 1, reference numeral designates 12 a saddle, 13 a front wheel, and 14 a handle, respectively.

Figure 2:
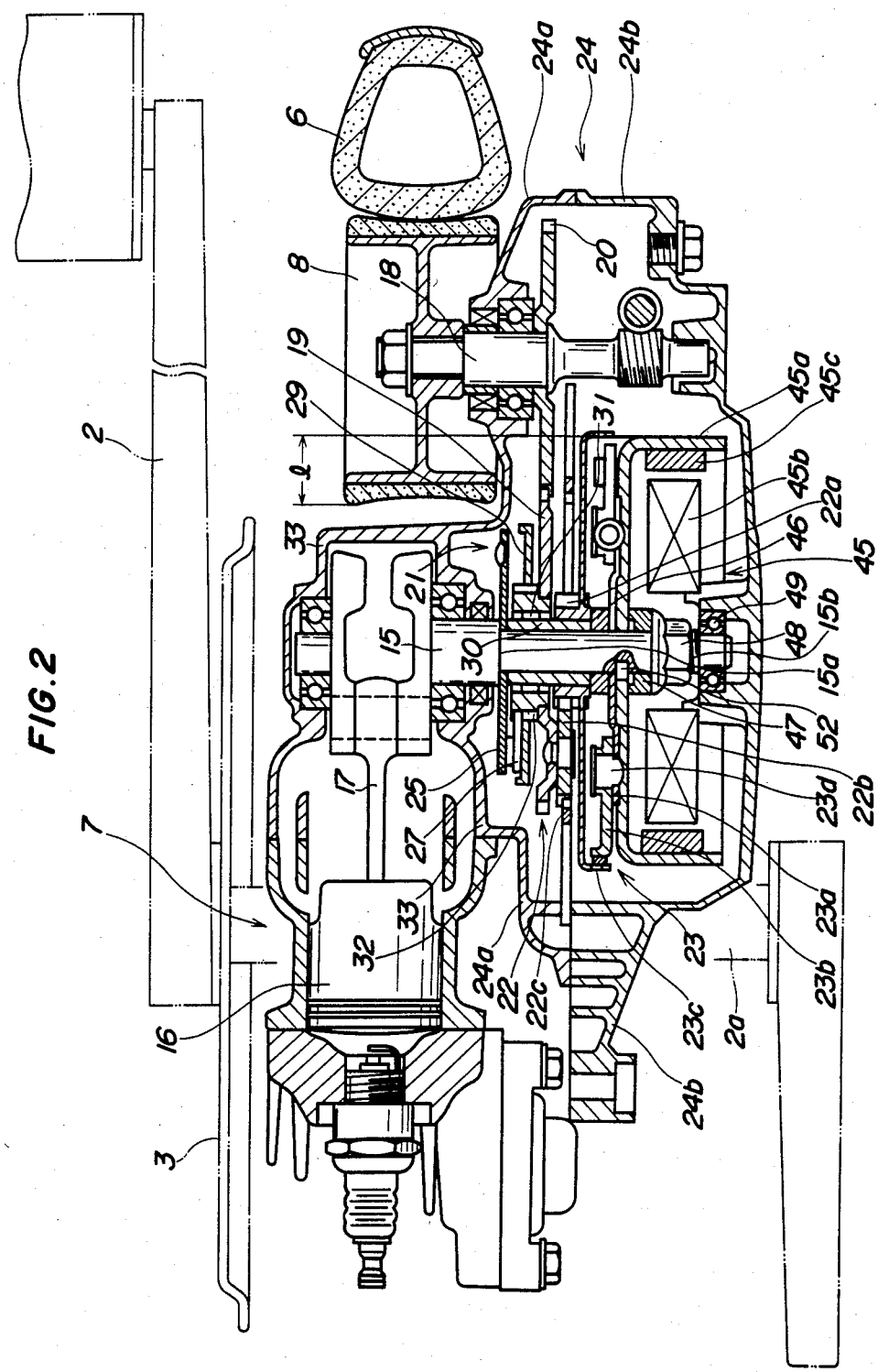
FIG. 2 is a horizontal sectional view of the drive system in FIG. 1.
Figure 4:
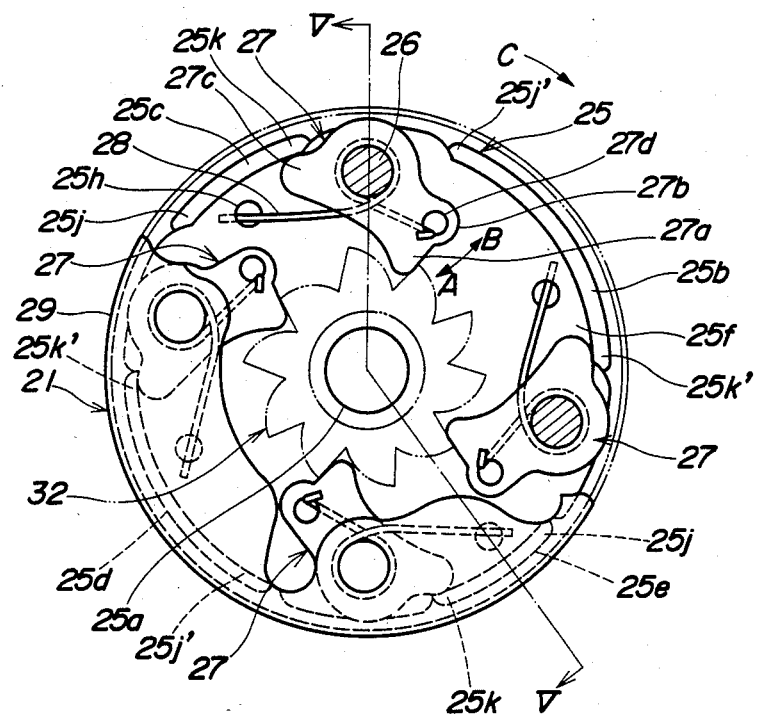
FIG. 4 is an elevational view, partly cut away, of a one-way clutch employed in the drive system.
Figure 5:
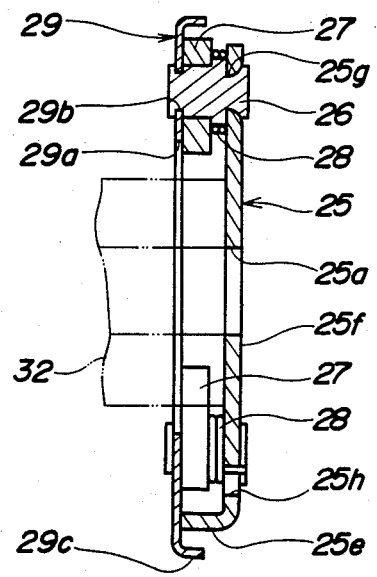
FIG. 5 is a sectional view taken along line V—V in FIG. 4.
Figure 6:
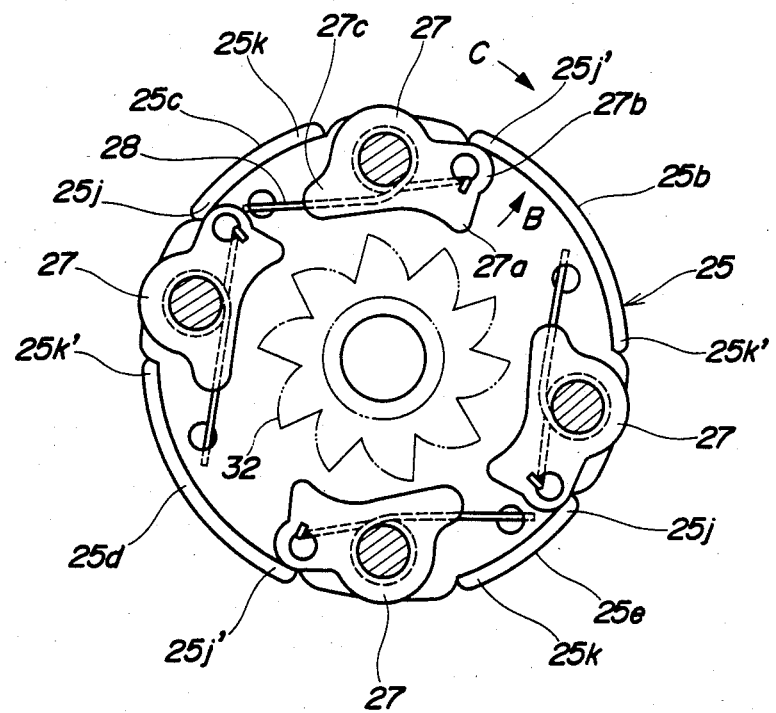
FIG. 6 is a view similar to FIG. 3, showing the one-way clutch, in an inoperative state.

The engine 7 is a two-cycle engine, and has a crankshaft 15 arranged below the pedal crank 2 and extending parallel therewith as shown in FIG. 2. A piston 16 of the engine 7 is coupled to the crankshaft 15 by means of a connecting rod 17. The friction roller 8 is rigidly secured on a drive shaft 18 which extends parallel with the crankshaft 15 and is rotatably supported by an engine casing 24a extending from a crankcase 33 and a casing cover 24b, as hereinafter described in detail. A gear train formed by gears 19, 20 meshing with each other is interposed between the shafts 15, 18, which transmits the rotation of the drive shaft 18 to the crankshaft with a reduction ratio appropriate for smooth and positive starting of the engine at the start of same. A one-way clutch 21 is interposed between the crankshaft 15 and the gear 19 on the same shaft, which, as shown in FIGS. 4 through 6, comprises a ratchet 32 joined integrally with the gear 19 (in FIG. 2), four pawls 27 engaging with the ratchet 32, and a support plate 25 supporting the pawls 27 thereon. To be specific, the support plate 25 has a generally circular configuration and is formed therein with a central axial hole 25a. The peripheral edge of the support plate 25 is bent nearly at right angles to the surface of a main body 25f thereof in the same direction to form a plurality of, e.g. four bent peripheral walls 25b–25e circumferentially arranged at suitable intervals (hereinafter called "the bent portions"). The main body 25f of the support plate 25 has its peripheral portion formed with a plurality of, e.g. four through holes 25g circumferentially arranged at predetermined intervals and along the same circumference, each hole 25g being located at a location circumferentially middle and radially inward of a respective one of the bent portions 25b–25e. The support plate 25 is formed of a one-piece iron plate of a given thickness which has been fabricated by stamping. As shown in FIG. 6, the bent portions 25b–25e each have an arcuate configuration with opposite end engaging portions 25j (25j'), 25k (25k') for limiting an extreme position of its respective pawl 27 in the direction indicated by the arrow B in FIG. 6 and for limiting another extreme position of the pawl 27 in the direction indicated by the arrow A in FIG. 4. With these engaging portions 25j (25j'), 25k (25k'), the bent portions 25b–25e limit the extreme positions of the respective pawls 27, while serving to reinforce the support plate 25, thus permitting to reduce the thickness of the support plate 25.

The holes 25g of the support plate 25 each receive an end of a fulcrum shaft 26 rigidly fitted therein and extending at right angles to the surface of the main body 25f of the support plate 25. The pawls 27 are pivotally supported on the respective fulcrum shafts 26. Springs 28 are wound around the respective fulcrum shafts 26, each of which is engaged at one end by a hole 27d formed in one end 27b of the pawl 27, and at the other end by a hole 25h formed in the main body 25f of the support plate 25, to impart a force to the pawl 27 to bias same in the direction indicated by the arrow A so as to cause the pawl 27 to be pivoted about its fulcrum shaft 26 toward the center of the hole 25a of the support plate 25, as shown in FIGS. 4 and 6.

A cover 29 is supportedly fitted on the fulcrum shafts 26 in contact with end faces of the bent portions 25b–25e of the support plate 25, with the pawls 27 rotatably supported on the respective fulcrum shafts 26 between the main body 25f of the support plate 25 and the cover 29. The cover 29 has a generally disk-shaped configuration with a diameter slightly larger than that of the support plate 25 and is formed with a large opening 29a at its center as well as with holes 29b at locations corresponding to the respective fulcrum shafts 26. The peripheral edge of the cover 29 is bent nearly at right angles to the main portion thereof toward the support plate 25 to form a peripheral wall 29c. The cover 29 may preferably be formed of a thin stamped iron plate. The peripheral wall 29c serves to increase the rigidity of the cover 29, thus permitting to reduce the thickness of the cover 29. The ends of the fulcrum shafts 26 fitted on the respective holes 29b of the cover 29 are secured to the cover 29 by caulking.

As shown in FIG. 4, each of the pawls 27 is urged by the respective spring 28 in the direction indicated by the arrow A. When no external force is applied to the one-way clutch, an end 27c of the pawl 27 is urged against the inner peripheral surface of the respective bent portion 25b–25e at the circumferential end 25k (25k') thereof, to thus prohibit further pivoting of the pawl 27 in the direction indicated by the arrow A. In this position, each pawl 27 has its engaging portion 27a meshing with the ratchet 32 indicated by the two-dot chain line in FIG. 4. Since each pawl 27 is thus prohibited from further pivoting by the inner peripheral surface of the respective bent portion 25b–25e, the engaging portion 27a of the pawl 27 and the ratchet 32 can be easily meshed together in assembling them.

Figure 3:
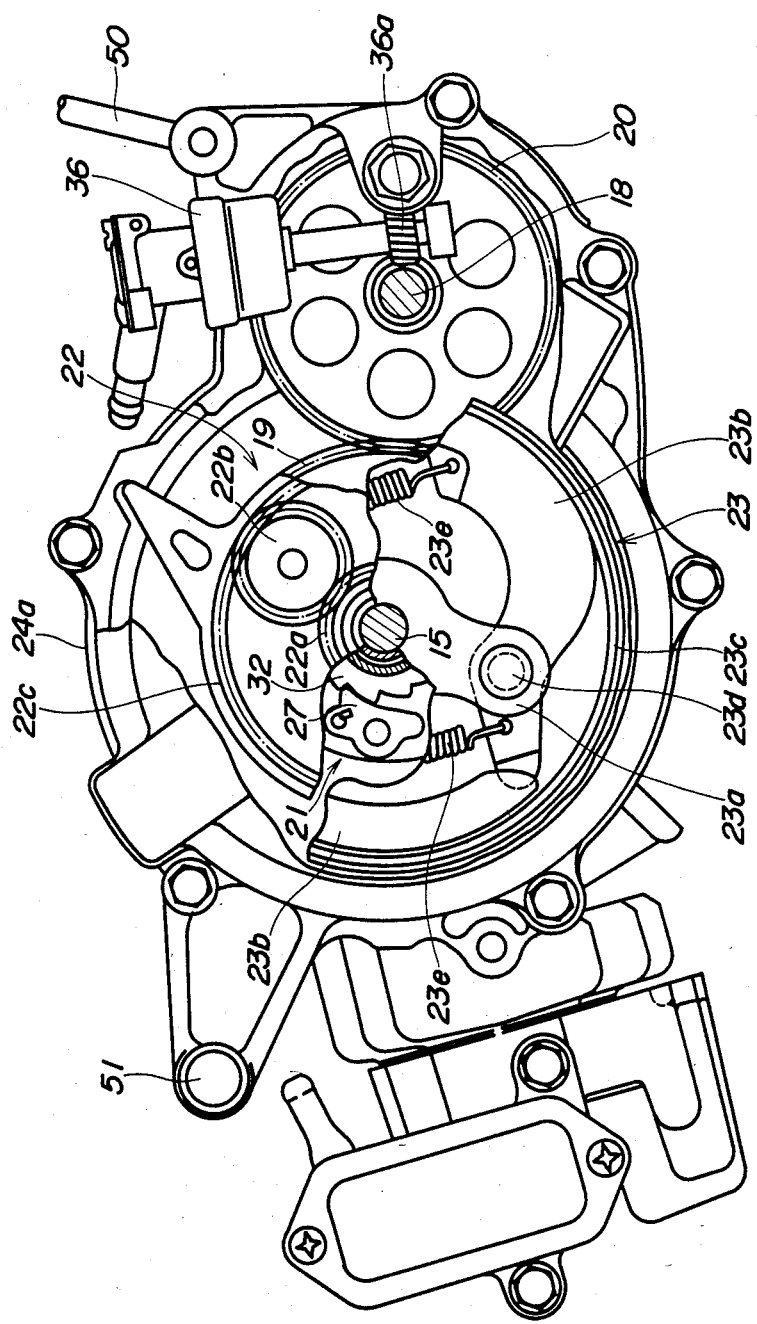
FIG. 3 is an elevational view, partly in section, of the drive system.

As shown in FIGS. 2 and 3, a planetary gear 22 and a centrifugal clutch 23 are disposed around the crankshaft 15. The planetary gear 22 comprises a sun gear 22a rotatably fitted on the crankshaft 15, a planet gear 22b mounted on the gear 19 on the crankshaft 15, and an internal gear 22c rigidly clamped between the body 24a of the engine casing 24 and the cover 24b of same. The centrifugal clutch 23 comprises a disk 23a, and a centrifugal shoe 23b pivoted at 23d to the disk 23a for radial displacement and permanently urged by a spring 23e in the radial inward direction, and a clutch housing 23c formed integrally with the above-mentioned sun gear 22a. When the rotational speed of the crankshaft 15 exceeds a predetermined value, the centrifugal shoe 23b is radially outwardly displaced into frictional engagement with a rimmed inner wall of the clutch housing 23c to thereby establish engagement of the centrifugal clutch 23. The one-way clutch 21 is adapted to be disengaged when the centrifugal clutch 23 is thus engaged. The planetary gear 22 transmits the rotation of the crankshaft 15 to the drive shaft 18 through the gear train 19, 20 with a large reduction ratio appropriate for normal operation of the engine.

Details of the drive shaft 18 supporting the friction roller 8 are illustrated in FIG. 7. As shown in the figure, the drive shaft 18 is formed integrallly with an annular flange 18a at a predetermined intermediate location. A trunk portion 18b extends fom the annular flange 18a toward the friction roller 8, on which are fitted the final gear 20 of the gear train and a radial bearing 35. From the trunk portion 18b extends a roller mounting portion 18c with a smaller diameter than the trunk portion 18b and formed with a threaded peripheral surface 18c' extending from its tip for a suitable distance. A driving gear 18d is formed integrally on an end portion of the drive shaft 18 remote from the friction roller 8 and meshes with a driven gear 36a of an oil pump 36 appearing in FIG. 3.

The manner of mounting the final gear 20, the radial bearing 35 and the friction roller 8 onto the drive shaft 18 constructed as above will now be explained. First, the final gear 20 and the radial bearing 35 are fitted onto the drive shaft 18 from the side of the roller mounting portion 18c, followed by fitting the roller mounting portion 18c of the drive shaft 18 through an axial through hole 37 formed in the casing body 24a from the inside thereof, until an outer race 35a of the radial bearing 35 becomes fitted into an annular recess 38 formed in the inner peripheral surface of the axial through hole 37. Then, a spacer 39 and a sealing member 40 are fitted onto the trunk portion 18b of the drive shaft 18, followed by screwing onto the roller mounting portion 18c of the drive shaft 18 then exposed to the outside of the casing body 24a a boss 8a of the friction roller 8 and then screwing a nut 41 onto the threaded tip 18c' to fasten the boss 8a to the drive shaft 18. Thus, an annular recessed surface 20b' of a boss 20b of the final gear 20 formed by an extrusion process along the perimeter of an axial hole 20a in the final gear 20 is supported by a flat end face 18a' of the annular flange 18a. Further, an inner race 35b of the radial bearing 35 has its opposite end faces disposed in contact with a convex end face 20b'' of the boss 20b of the final gear 20 and the spacer 39, while the boss 8a of the friction roller 8 is disposed in contact with the spacer 39, wherein the final gear 20, the inner race 35b of the radial bearing 35, the spacer 39, and the friction roller 8 are tightly fastened together to the drive shaft 18 by means of the single nut 41 alone. An elastic friction member 8b is applied over the outer peripheral surface of the friction roller 8 for frictional contact with the rear wheel 6.

After the drive shaft 18 has been incorporated into the casing body 24a in the above manner, the casing cover 24b is joined to the casing body 24a in a manner that an inner end of the drive shaft 18 is supportedly fitted in a bearing 42 formed integrally on an inner surface of the casing cover 24b.

By virtue of the arrangement that at least the final gear 20, the bearing 35, and the friction roller 8, which have successively been fitted onto the drive shaft 18 from the side of its outer end, are borne by the annular flange 18a formed on the drive shaft 18 at a predetermined axial location, and are fastened together by means of the screw member 41 screw fitted on the outer end of the drive shaft 18, a portion of the drive shaft 18 on the side of the friction roller 8 with respect to the annular flange 18a does not require machining to form a key way, a Cir-clip seating groove, etc., therein, which have conventionally been employed, but requires only machining for cylindrical shaping and thread cutting of the drive shaft material for formation of the threaded portion 18c'. Moreover, the axial holes of the final gear 20 and the drive shaft 18 can be simply circular in shape. In addition, just a single nut 41 suffices to put these parts together, thus diminishing the number of man-hour for the machinining and assemblage operations, as well as enhancing the machining tolerances of the component parts.

According to the above described manner of mounting of the final gear 20, the radial bearing 35, and the friction roller 8 onto the drive shaft 18, required torque transmission can be performed only by frictional force developed between the adjacent component parts if the arrangement is applied to a bicycle-type motorcycle requiring small power transmission. To assure positive torque transmission between the component parts without relative slippage thereof, the final gear 20 and the bearing 35 may be force fitted onto the drive shaft 18. Alternatively, as shown in FIG. 7, the recessed end face 20b' of the boss 20b of the final gear 20 may be formed integrally with a pawl 20c flush therewith and engaged in a notch 18a'' formed in the annular flange 18a of the drive shaft 18. Further, a serration, not shown, may be formed on a surface portion of the roller mounting portion 18c inwardly adjacent the threaded portion 18c', to support the boss 8a of the friction roller 8 fitted thereon.

Referring again to FIG. 2, reference numeral 45 designates an alternating current generator mounted on an end portion of the crankshaft 15. A rotor 45a of the generator 45, which also functions as a flywheel, is arranged on one side of the transmission gear mechanism 19, 20, and 22, while the friction roller 8 is arranged on the other side of the same mechanism and at a location offset with respect to the rotor 45a in a direction perpendicular to the axes of the crankshaft 15 and the drive shaft 18. The rotor 45a of the generator 45 and the friction roller 8 are so located that the outer peripheral edges of them overlap with each other in the above direction by an amount l in a plane extending in which are located the axes of the drive shaft 18 and the crankshaft 15, as shown in FIG. 2. In FIG. 2, reference numeral 45b denotes a coil of the generator, and 45c a magnet of same, respectively.

By virtue of the offset arrangement of the friction roller 8 and the generator rotor 45, it is possible to reduce the length of the crankshaft 15 as well as the distance between the crankshaft 15 and the drive shaft 18, thereby enabling to design the drive system compact in size such that the system can be easily arranged below the pedal crank 2. Further, since in addition to the overlapping arrangement of the generator rotor 45a and the friction roller 8, the generator coil 45b is arranged radially inwardly of the rotor 45a, the rotor 45a can be designed large in diameter enough to obtain a large generator capacity. Besides, also the centrifugal clutch 23, which is generally arranged in the vicinity of the generator 45, can be designed large in diameter enough to increase the capacity of power transmission, or the transmission gear mechanism 19, 20, and 22 can be designed to have an increased reduction ratio.

Next, the manner of mounting onto the crankshaft 15 the one-way clutch 21, the gear 19, the planetary gear 22, the centrifugal clutch 23, and the alternating current generator 45, etc. will be explained.

The crankshaft 15 comprises two different diameter adjacent portions defining therebetween a stepped shoulder 15a located outside the crankcase 33. The support plate 25 of the one-way clutch 21 is securely fitted at a hole 25a (in FIG. 4) onto the crankshaft 15 in contact with the stepped shoulder 15a, as shown in FIG. 2. Then, a bush 30 is fitted onto the crankshaft 15. Rotatably fitted on the bush 30 via a bearing 31 is the aforementioned ratchet 32 joined integrally with the gear 19, one end of which is freely fitted through the hole 29a (in FIG. 5) of the cover 29 of the one-way clutch 21 into the one-way clutch 21 where it is meshed with each of the engaging portions 27a of the pawls 27.

Also rotatably fitted onto the bush 30 is the aforementioned sun gear 22a which is formed integrally with the clucth housing 23c of the centrifugal clutch 23, into meshing engagement with the planet gear 22b mounted on the gear 19. Then, fitted onto the crankshaft 15 are a distance collar 46, the disk 23a of the centrifugal clutch 23, and the generator rotor 45a in the mentioned order, in a manner that they are in contact with an end face of the bush 30, followed by location of them by means of a knock pin 52. Another distance collar 47 is fitted onto the crankshaft 15 into contact with an inner end face of the generator rotor 45a, followed by screwing a fastening nut 48 onto a threaded end portion 15b of the crankshaft 15 to fasten the support plate 25, the bush 30, the distance collar 46, the disk 23a of the centrifugal clutch 23, and the generator rotor 45a fitted thereon, together and to the crankshaft 15. Finally, the end portion of the crankshaft 15 is supportedly fitted into a radial bearing 49 previously mounted on the casing cover 24b.

Since, as stated above, tubular members, i.e., the bush 30 and the distance collar 46, the generator rotor 45a, etc. fitted on the crankshaft 15 are clamped in place between the stepped shoulder 15a of the crankshaft 15 and the nut 48 by screwing the nut 48 onto the crankshaft 15, the crankshaft 15 can be in the form of a simple round bar and therefore can be machined in a much more simple manner than by a conventional method which typically comprises shaping the end portion of the crankshaft in the form of a tapered conical surface, shaping the peripheral wall of a mounting boss bore of the generator rotor in the form of a correspondingly tapered surface, and screwing a nut onto the tapered end portion of the crankshaft to fasten the generator rotor and the other parts as mentioned above, to the crankshaft. Therefore, variations in the sizes of the tubular members and/or the crankshaft 15 can be easily compensated for by adjusting the screwing amount of the nut 48 onto the crankshaft 15, thus making it possible to manufacture the drive system with ease and at a low cost. Also, the drive system can be assembled or dismantled with ease.

With the above described arrangement of the drive system, to start the engine 7, an operating lever, not shown, arranged in the vicinity of a handle grip 14a of the bicycle 1 is operated to actuate a lifting rod 50 to rotate the engine 7 about its fulcrum shaft 51 into a lifted position shown in FIG. 1 wherein the friction roller 8 is in urging contact with the tire of the rear wheel 6. The operating lever is then locked in position to hold the engine in the lifted position. In this starting position, each pawl 27 of the one-way clutch 21 is biased in the direction indicated by the arrow A in FIG. 4 by the force of the respective spring 28 so that the respective engaging portion 27a meshes with the ratchet 32. Therefore, a driving force transmitted from the rear wheel 6 rotated by operating the pedal crank 2 to the friction roller 8 is further transmitted through the drive shaft 18, the gear train 19, 20 and the one-way clutch 21 to the crankshaft 15 to thereby start the engine 7. On this occasion, the power or driving force is also transmitted from the gear 19 to the planetary gear 22, the latter then runs idle, since the centrifugal clutch 23 is then in a disengaged state.

As the crankshaft speed increases after the start of the engine, the centrifugal shoe 23b of the centrifugal clutch 23 is radially outwardly displaced into urging contact with the rimmed inner surface of the clutch housing 23c to thereby establish engagement of the clutch 23, whereby the rotation of the crankshaft 15 is transmitted to the planetary gear 22 and decelerated thereby. On the other hand, when the rotational speed of the crankshaft 15, which is rotating in the direction indicated by the arrow C in FIG. 4, exceeds the rotational speed of the ratchet 32 which is being driven by the friction roller 8, the one-way clutch 21 loses its power transmission function to cause disengagement of the clutch 21. Thereafter, as the crankshaft speed further increases, the resulting increased centrifugal force acts upon the end 27b of each pawl 27, and when the increased centrifugal force exceeds the setting load of its associated spring 28 acting in the direction indicated by the arrow A in FIG. 4, the pawl 27 is rotated counterclockwise as indicated by the arrow B in the figure so that its engaging portion 27a is disengaged from the ratchet 32 as shown in FIG. 6.

On the other hand, power transmitted from the crankshaft 15 to the planetary gear 22 is further transmitted through the gear train 19, 20 to the drive shaft 18, and accordingly the rotating friction roller 8 rotatively drives the rear wheel 6.

Although in the foregoing embodiment a power transmission means is provided between the crankshaft 15 and the drive shaft 18, which is formed by gears 19, 20, the same means may be formed by any other means insofar as it can transmit the rotation of the drive shaft 18 to the crankshaft 15 with a reduction ratio appropriate for smooth and positive start of the engine. For instance, the power transmission means may comprise a pair of pulleys rigidly fitted on the respective crankshaft 15 and drive shaft 18, and a belt drivingly coupling these pulleys together.

What is claimed is:

1. A drive system for use in a light vehicle including an engine having a crankshaft and a wheel, said drive system including a friction roller disposed for frictional engagement with said wheel for transmitting the rotation of said engine to said wheel, said drive system being adapted to transmit the rotation of said wheel to said engine through said friction roller at the start of said engine, said drive system comprising: a drive shaft extending parallel with said crankshaft, said friction roller being supported on said drive shaft to be rotatively driven thereby; a power transmission means interposed between said drive shaft and said crankshaft, for transmitting the rotation of said drive shaft to said crankshaft with a given ration of spped change appropriate for starting said engine; a one-way clutch engaging with said power transmission means and adapted to transmit only the rotation of said drive shaft to said crankshaft, whereby the rotation of said drive shaft is transmitted to said crankshaft through said power transmission means and said one-way clutch at the start of the engine; and a platetary gear assembly coupled to said power transmission means with a given reduction ratio, said planetary gear assembly coupling to said power transmission means only when said crankshaft is transmitting rotation through said power transmission means to said friction roller.

2. A drive system as claimed in claim 1, wherein said planetary gear has a sun gear disposed on said crankshaft.

3. A drive system as claimed in claim 1, including a generator rotor secured on said crankshaft, said friction roller being disposed on one side of said power transmission means, said generator rotor being disposed on the other side of said power transmission means, said generator rotor and said friction roller overlapping with each other in a direction perpendicular to the axes of said crankshaft and said drive shaft in a plane in which said crankshaft and said drive shaft are located.

4. A drive system as claimed in claim 3, including a tubular member and a hollow threaded member both fitted on said crankshaft, said crankshaft having a stepped shoulder formed therein, and a reduced diameter portion extending from said stepped shoulder and having a threaded end, said tubular member being fitted on said reduced diameter portion, said hollow threaded member being screwed on said threaded end of said reduced diameter portion, said generator rotor being fitted on said reduced diameter portion in a manner such that at least said tubular member is interposed between said stepped shoulder of said crankshaft and said generator rotor, at least said tubular member and said generator rotor being fastened together to said crankshaft by said hollow threaded member.

5. A drive system as claimed in claim 1, including an engine casing, a bearing provided on said engine casing and supporting said drive shaft, and a hollow threaded member fitted on one end of said drive shaft, said power transmission means comprising a gear train having a final gear thereof fitted on said drive shaft, said one end of said drive shaft extending through said engine casing to the outside and having a threaded portion formed thereon, on which said hollow threaded member is screwed, said drive shaft having a flange formed thereon at a predetermined location inside said engine casing, wherein at least said final gear of said gear train, said bearing, and said friction roller are fitted on said drive shaft in the order mentioned from said one end of said drive shaft between said hollow threaded member and said flange and fastened together to said drive shaft by said hollow threaded member.

6. A drive system for use in a light vehicle including an engine having a crankshaft and a wheel, said drive system including a friction roller disposed for frictional engagement with said wheel for transmitting the rotation of said engine to said wheel, said drive system being adapted to transmit the rotation of said wheel to said engine through said friction roller at the start of said engine, said drive system comprising: a drive shaft extending parallel with said crankshaft, said friction roller being supported on said drive shaft to be rotatively driven thereby; a power transmission means interposed between said drive shaft and said crnakshaft, for transmitting the rotation of said drive shaft to said crankshaft with a given ratio of speed change appropriate for starting said engine; a one-way clutch engaging with said power transmission means and adapted to transmit only the rotation of said drive shaft to said crankshaft, whereby the rotation of said drive shaft is transmitted to said crankshaft through said power transmission means and said one-way clutch at the start of the engine; and a platetary gear assembly coupled to said power transmission means and adapted to transmit the rotation of said crankshaft to said drive shaft through said power transmission means with a given reduction ratio, said planetary gear assembly including a centrifugal clutch disposed on said crankshaft for rotation therewith, said centrifugal clutch being adapted to transmit the rotation of said crankshaft to said drive shaft when the rotational speed of said crankshaft exceeds a predetermined value.

7. A drive system for a light weight vehicle including a wheel comprising
an engine having a crankshaft,
a friction roller positioned for frictional engagement with the wheel,
a drive shaft substantially parallel with said crankshaft supporting said friction roller,
a power transmission means between said driveshaft and said crankshaft, said transmission means having a speed change ratio appropriate for starting said engine,
a one way clutch coupling said power transmission means and said drive shaft, said one-way clutch coupling said power transmission means and said driveshaft only when said driveshaft is transmitting rotation to said crankshaft for starting said engine,
a planetary gear assembly between said power transmission means and said crankshaft, said planetary gear assembly having a speed change ratio combined with said power transmission ratio appropriate for driving the wheel from said engine, and
a clutch coupling said planetary gear system and said driveshaft, said clutch coupling said crankshaft and said planetary gear system only when said crankshaft is transmitting rotation to said friction roller to drive the vehicle.

8. The drive system of claim 7 wherein said clutch coupling said planetary gear system and said driveshaft engages when the rotational speed of said crankshaft exceeds a predetermined value.

* * * * *